United States Patent Office 2,790,837
Patented Apr. 30, 1957

2,790,837

CONTINUOUS PRODUCTION OF TRIMETHYL-OLETHANE

Max O. Robeson, Corpus Christi, Tex., assignor to Celanese Corporation of America, New York, N. Y., a corporation of Delaware No Drawing. Application June 8, 1954,
Serial No. 435,348

21 Claims. (Cl. 260—635)

This invention relates to the production of trimethylolethane and relates more particularly to the production of trimethylolethane by the reaction of formaldehyde and propionaldehyde in an alkaline medium.

Trimethylolethane is a crystalline solid polyhydric alcohol which is useful as a substitute for glycerol, e. g. in the manufacture of alkyd resins, improved drying oils, plasticizers, and fine chemicals. For example, this polyhydric alcohol may be reacted with a polycarboxylic acid or anhydride, e. g. phthalic or maleic anhydride, with or without a modifying reactant such as a drying oil fatty acid, to form an alkyd resin; or it may be reacted with a drying oil fatty acid alone to form a synthetic drying oil. It is customary to produce the trimethylolethane by the reaction of propionaldehyde with formaldehyde in an alkaline medium according to the equation:

$C_2H_5CHO + 3HCHO + MOH \longrightarrow$

Propion-    Formal-    Metal
aldehyde    dehyde    hydroxide

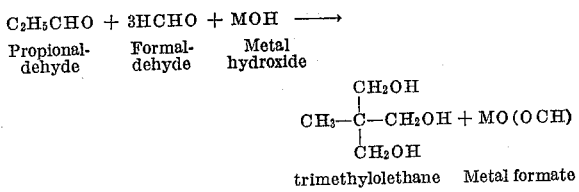

trimethylolethane    Metal formate

However, the prior art processes for carrying out this reaction and for recovering the resulting trimethylolethane have not been found to be as efficient or economical as desired.

One object of this invention is to provide a novel process for the production of trimethylolethane in a continuous manner.

Another object of this invention is the provision of a new and improved process for producing trimethylolethane continuously in good yields.

Other objects of this invention will be apparent from the following detailed description and claims.

In accordance with this invention crystalline trimethylolethane is produced by a process which comprises the steps of continuously reacting, in an aqueous medium, a mixture of propionaldehyde, an excess of formaldehyde, and sodium hydroxide, continuously reducing the pH of the reacted mixture, continuously removing formaldehyde by distillation of the mixture under pressure, and treating the resulting mixture to produce crystals comprising trimethylolethane.

In the process of this invention, the reactants, i. e. the formaldehyde, propionaldehyde and sodium hydroxide, are advantageously mixed together in a mixing zone to form a continuous aqueous stream comprising said reactants. For ease of handling and uniformity of mixing, and in order to initiate the reaction in the most satisfactory manner, the formaldehyde and sodium hydroxide are desirably supplied to the mixing zone in the form of aqueous solutions thereof. The reactants may be supplied to the mixing zone as individual streams thereof, or the two aldehydes may be blended together before they are mixed with the sodium hydroxide in the mixing zone. Thus, the aqueous formaldehyde may be blended with the propionaldehyde continuously to produce a stream of aqueous mixed aldehydes and the aqueous solution of alkali metal hydroxide may be injected into this stream in the mixing zone. It is less desirable to mix the sodium hydroxide separately with either aldehyde in the absence of the other aldehyde, since each of the aldehydes is susceptible to undesired autocondensation in the presence of the sodium hydroxide.

For best results the formaldehyde is supplied to the mixing zone in substantial excess over the amount theoretically necessary for reaction with the propionaldehyde. That is, for each mole of propionaldehyde there are supplied at least about 5 moles, e. g. about 5 to 15 moles, preferably about 8 to 12 moles, of formaldehyde. Due to the use of such high proportions of formaldehyde, the reaction is more complete and the yield of trimethylolethane is increased. Also, the use of such high proportions of formaldehyde suppresses the formation of undesired heat-sensitive compounds which make it difficult to isolate the desired trimethylolethane from the reacted mixture.

It is also advantageous to employ an amount of sodium hydroxide which is in excess over the amount theoretically necessary for the reaction. Thus, for each mole of propionaldehyde there are preferably supplied about 1.1 to 1.2 moles of sodium hydroxide. However, too large an excess, e. g. more than about 1.3 moles of sodium hydroxide, is less desirable since it promotes side reactions and hinders the isolation of trimethylolethane from the reaction products.

On mixing, the reactants begin to react vigorously. The conditions in the mixing zone should be such that substantially complete mixing, to produce a homogeneous mixture, takes place rapidly, e. g. within a period of less than one minute. To this end the mixing zone may be in the form of a suitably designed mixing pump, or a pipe in which there is turbulent flow, or an orifice mixer, or a vessel equipped with suitable agitator.

From the mixing zone the reacting mixture is passed in a continuous stream through another zone where the reaction proceeds. This other zone may comprise an apparatus, i. e. a reactor, of any suitable construction, e. g. a cylindrical vessel provided with internal baffles to minimize recirculation, or back-mixing, of the mixture passing through it. The capacity of the reactor and the rate of flow of the mixture therethrough are such that the material remains in the reactor for a sufficient period of time to allow the substantial completion of the reactions resulting in the formation of trimethylolethane at the temperature of reaction.

The exothermic reaction between the propionaldehyde formaldehyde and sodium hydroxide causes the temperature of the reaction mixture to rise. For optimum results this temperature should rise to a peak which is within the range of about 40 to 55° C.; higher temperatures tend to cause side reactions and color formation, while at lower temperatures the desired reaction proceeds at too slow a rate for efficient practical operation.

Advantageously, the reactor is operated adiabatically, i. e. substantially without adding heat or abstracting any of the heat of reaction. Because of the presence of substantial amounts of water in the reaction mixture the heat capacity of the mixture is relatively high so that the exothermic heat of reaction does not raise the temperature of the mixture to a level above the desired range. For example, the reactants may be mixed at an initial temperature of about 20 to 32° C. and, depending on the amount of water present, the adiabatic increase in temperature may be 22 to 27° C. The amount of water, expressed as ratio of water to propionaldehyde, is advantageously between about 23:1 to 28:1. Based on the total weight of the reaction mixture, the water content is preferably about 78 to 80%. This water content is advantageously attained, as described above, by supplying the formaldehyde and sodium hydroxide in the form of aqueous solutions thereof, the formaldehyde preferably being supplied as an aqueous solution containing about 20% of formaldehyde, by weight. When appropriate, the reactor may be heated or cooled to maintain the temperature of the reacting mixture within the optimum range though such a procedure is less desirable than adiabatic operation.

When the mixture leaves the reactor it is alkaline, generally having a pH of about 9.8 to 10.5, and its pH should be reduced so as to avoid undesirable side reactions in the subsequent processing steps and to prevent any further reaction of formaldehyde and sodium hydroxide. For best results the pH of the reaction mixture leaving the reactor is reduced to about 5.5 to 7.0, preferably about 6.0 to 7.0, by the addition of an acidic material thereto. Suitable acidic materials are formic acid, acetic acid, sulfuric acid or phosphoric acid.

After the addition of the acidic material, the mixture is subjected to distillation under pressure to remove aqueous formaldehyde as a distillate therefrom. To this end a stream of the acidified mixture is advantageously led into a continuously operating distillation column maintained under a pressure of about 10 to 30, preferably about 15 to 20, pounds per square inch gauge, corresponding to a maximum distillation temperature of about 135° C. Advantageously, the aqueous formaldehyde obtained as the distillate is recycled to the mixing zone to react with further quantities of propionaldehyde. The use of superatmospheric pressure in the distillation step makes it easier to recover the unreacted formaldehyde overhead in a practical concentration suitable for recycling and to remove substantially all of the unreacted formaldehyde from the reaction mixture. It is advantageous to carry out the distillation until not more than 1.0% of formaldehyde remains in the mixture, and, for best results, the weight of formaldehyde remaining should not be more than about 1/20 of the weight of the trimethylolethane in the reaction mixture. If the formaldehyde content is much higher, side reactions tend to occur in later stages of the process and crystallization and recovery of pure trimethylolethane are more difficult.

After the distillation step the aqueous reaction mixture containing trimethylolethane and sodium formate is treated for the recovery of crystalline trimethylolethane therefrom. In a preferred procedure, hereinafter called the "multiphase method," this treatment involves the admixture of an aqueous solution containing sodium formate and trimethylolethane with an organic solvent which is a solvent for trimethylolethane, and is a non-solvent for sodium formate, e. g. a lower aliphatic alcohol such as n-propanol or isopropanol. The organic solvent is present in such concentration that there is formed a mixture comprising two liquid phases: a water phase and an organic solvent phase, the dissolved sodium formate being concentrated in the water phase and the trimethylolethane being concentrated in the organic solvent phase. The organic solvent phase is then drawn off and treated for the recovery of the trimethylolethane therefrom. Thus, the organic solvent may be distilled therefrom, as by steam stripping, and the trimethylolethane may be crystallized from the residue. Advantageously, the amount of water present is insufficient to dissolve all of the sodium formate in the presence of the organic solvent. Accordingly, three phases are present; that is, the two liquid phases and a crystalline sodium formate phase which is preferably covered by the liquid water phase.

As stated, the "multiphase method" involving the use of an organic solvent may be used for the treatment of the aqueous reaction mixture containing trimethylolethane and sodium formate after substantially all of the formaldehyde has been removed therefrom by distillation under pressure. The water content of the reaction mixture after this distillation of formaldehyde is generally rather high and it is therefore preferable to subject the reaction mixture, after the formaldehyde removal step, to an evaporation step for the purpose of removing a portion of the water therefrom before mixing said reaction mixture with the organic solvent.

In place of the "multiphase method" for separating trimethylolethane from the aqueous reaction mixture there may be employed a method hereinafter termed the "concentration method." In this "concentration method" the aqueous reaction mixture, after the substantial removal of formaldehyde therefrom, is first concentrated, in a suitable evaporator, until the dissolved solids content thereof is about 60 to 70%. This solids content corresponds to a water content of about 40 to 30%, respectively, in comparison with the original water content, before reaction, of over 70% and the water content, after formaldehyde distillation, of about 50 to 70%. The evaporation step is advantageously carried out at an elevated temperature. For example, the evaporation step may be carried out at atmospheric pressure while maintaining the mixture at its boiling point until its boiling point has been raised to about 110 to 125° C. The evaporation step may also be carried out at subatmospheric pressure, e. g. at 425 mm. of mercury absolute until the boiling point of the mixture, at this pressure has been raised to 100° C. The resulting hot, concentrated liquid is then cooled, e. g. to a temperature of about 10 to 30° C., preferably about 20° C., to cause the precipitation of crystals of trimethylolethane therefrom. These crystals are separated from the mother liquor in any suitable manner, e. g. by filtration or centrifuging, and then washed, preferably with a small amount of cold water. By this operation a large proportion, e. g. about 60% or more, of the trimethylolethane contained in the reaction mixture may be recovered as a first crop.

In the practice of the "concentration method" additional crops of crystals may be obtained by further concentrating the mother liquor separated from the first crop. One convenient method for obtaining the additional crops of crystals involves evaporating water from this mother liquor at atmospheric pressures and at temperatures higher than those attained in the first evaporating step, followed by cooling to precipitate crystals comprising trimethylolethane.

The crude crystals obtained by the "concentration method" contain varying amounts of sodium formate. The amount of this formate is relatively small in the first crop and much larger in the subsequent crops. To separate the trimethylolethane from the sodium formate, the crude crystals may be extracted with a liquid which, under the conditions of the extraction, is a good solvent for trimethylolethane and a poor solvent for sodium formate. Suitable liquids are methanol, ethanol, propanol or isopropanol, for example. The trimethylolethane may be recovered from the resulting solution in any desired manner.

The "multiphase method" may be combined with elements of the "concentration method." Thus, in one suitable procedure, after the substantial removal of the formaldehyde the reaction mixture is concentrated until the dissolved solids content thereof is about 60 to 70%, corresponding to a water content of about 40 to 30%, respectively, and the resulting concentrated solution is cooled to precipitate a crop of crystals therefrom. Preferably the crystallization operation is carried out so as to precipitate only about one half, or less, of the trimethylolethane present in the reaction mixture so as to minimize the amount of sodium formate present in the crystals. The mother liquor, comprising water, sodium formate and trimethylolethane, is separated from the crystals and mixed with the organic solvent to form the mixture containing two liquid phases described above. The organic solvent phase is then drawn off and treated for the recovery of trimethylolethane therefrom.

The "multiphase method" may be conveniently carried out in a decanter in which the reaction mixture or mother liquor being treated and the organic solvent are mixed thoroughly and then allowed to stand for a suitable period, e. g. 15 minutes, to permit the phases to separate. Of course, the thorough mixing of the reaction mixture or mother liquor with the organic solvent may be carried out in a separate apparatus and the resulting mixture then transferred to the decanter. The latter procedure is particularly desirable when the "multiphase method" is to be carried out on a continuous basis. In one convenient continuous method the reaction mixture or mother liquor is blended continuously with the organic solvent in a mixing pump and then passed through a heat exchanger, where its temperature is adjusted, and into a decanter. In this continuous method the capacity of the decanter and the rate of flow of the mixture thereto are such that the residence time of the mixture therein is sufficient to insure adquate separation of the phases. An organic solvent layer and an aqueous layer, preferably including a slurry containing crystalline sodium formate, are drawn off continuously from the upper and lower portions, respectively, of the decanter. The slurry is centrifuged or filtered to remove the sodium formate crystals therefrom, the remaining aqueous phase being recycled to the evaporation step, if desired. The upper organic solvent phase is, as stated, treated for the recovery of the trimethylolethane therefrom.

In the practice of the "multiphase method" the proportions of water and organic solvent may be readily determined by simple experiment. Thus, the amount of the organic solvent is advantageously sufficient to saturate the water phase therewith and to dissolve the trimethylolethane so that no crystalline trimethylolethane separates from the organic solvent phase. The specific proportions necessary to effect these results will depend, of course, on the temperature of the mixture, since the solubility of trimethylolethane in organic solvents, such as isopropanol, increases as the temperature increases. However, the proportions of the alcohol may be varied considerably. For example, when a three-phase system containing dissolved trimethylolethane and comprising a water phase, an isopropanol phase and a crystalline sodium formate phase was altered by increasing the isopropyl alcohol content thereof fourfold, no substantial change in the volume of the water phase or crystalline sodium formate phase occurred. From a practical standpoint it is undesirable to employ too much of the organic solvent, particularly when the trimethylolethane is to be separated from the organic solvent by distillation since, as the amount of organic solvent is increased, the load on the distillation equipment is increased correspondingly.

As stated, in the practice of the "multiphase method" the amount of water present is also determined by simple experiment. Thus, when a three-phase system, as described above, is altered by the addition of water thereto, the crystalline sodium formate phase disappears and then, as the amount of water is increased still further the mixture becomes homogeneous so that it contains only a single liquid phase. On the other hand, if the water content is too low two liquid phases will not be present. The amount of sodium formate present also has an effect on the number of phases in the system. Thus, if a slurry of crystalline sodium formate in water is added to a single-phase liquid mixture comprising water, isopropanol and trimethylolethane, the slurry at first dissolves in the liquid mixture. Addition of more of the slurry causes the mixture to separate into two liquid phases. On still further addition of the slurry to the mixture crystalline sodium formate remains undissolved.

Advantageously, when isopropanol is used as the organic solvent in the "multiphase method" the multiphase mixture should contain at least about 10% by weight of sodium formate, at least about 17% by weight of water and at least about 35% by weight of the isopropanol. For example, in one suitable method this mixture contains 20% by weight of water, 20% by weight of sodium formate, 40% by weight of isopropanol and 20% by weight of trimethylolethane. It will be observed that in this example the weight ratio of sodium formate to trimethylolethane is 1:1, which is higher than the weight ratio of sodium formate to trimethylolethane produced in the propionaldehyde-formaldehyde-sodium hydroxide reaction. This increased proportion of sodium formate relative to trimethylolethane is advantageously attained by the previously described recycling of the separated aqueous phase to the evaporation step.

The temperature at which the phases are separated may be varied as desired. Thus, excellent results have been obtained when the "multiphase method" has been operated at temperatures within the range of about 20 to 50° C.

The concentration of dissolved sodium formate in the water phase is relatively high, advantageously about 35 to 45. The organic solvent phase generally contains some water and some dissolved sodium formate, the concentration of the latter in said organic solvent phase being relatively low, advantageously below 10%.

By the use of the "multiphase method" reaction mixtures, concentrates, or mother liquors having relatively high water contents, e. g. about 20 to 60% water, may be treated easily to separate sodium formate and other water-soluble impurities from the trimethylolethane. It is often desirable to add to the aforesaid reaction mixtures, concentrates, or mother liquors a mixture of water and the organic solvent rather than the organic solvent alone, particularly when the reaction mixtures, concentrates or mother liquors have water contents in the lower portion of the above range, e. g. water contents of 20 to 35%. Thus, there may be added an azeotropic mixture of isopropanol or n-propanol and water, which mixture may be obtained easily by the distillation, e. g. steam stripping, of the propanol-containing phase, no drying of said azeotrope being necessary.

When the organic solvent phase obtained by the multiphase method is heated in the presence of added water, e. g. heated by passing steam thereinto, to drive off the organic solvent, there is obtained an aqueous solution from which crystals of trimethylolethane may be recovered by simple cooling, e. g. to a temperature below 30° C. The crystals obtained by cooling aqueous solutions of trimethylolethane contain bound water, which water may be removed by suitable drying. Thus, the crystals may be dried to a water content of 2% or less by heating them at atmospheric pressure and a temperature of, e. g. 90 to 100° C., as on a drum dryer. Alternatively, the crystals may be dried to the same extent under vacuum without heating. Spray drying may also be employed.

In order to illustrate the invention further, the following examples are given.

*Example I*

4000 parts by weight per hour of 20.0% aqueous solution of formaldehyde (26.7 moles), 144 parts by weight per hour of propionaldehyde of 91.5% purity (2.28 moles) and a solution of 112 parts by weight per hour of sodium hydroxide (2.8 moles) in 447 parts by weight of water are blended continuously at a temperature of 23° C., in a mixing zone, to form a continuous stream of reaction mixture, which is passed through a suitable reactor. Due to the heat of reaction, the temperature of the stream flowing through the reactor rises within 25 minutes after mixing to 47.° C. The stream of reaction mixture is permitted to react adiabatically while flowing through the reactor for a total period of two hours, during which time the temperature does not rise above 47°

C., and is then acidified to a pH of 6.0 by the addition of 0.0028 mole per hour of acetic acid. The resulting acidified stream is subjected to continuous distillation at a pressure of 15 pounds per square inch gauge and temperature of 125° C. to reduce the formaldehyde content thereof to 0.7%. During this continuous distillation there is recovered, in the form of 15.6% aqueous solution thereof, 97.5% of the excess formaldehyde, i. e. 97.5% of the amount of formaldehyde originally present in the reaction mixture in excess of that theoretically required to react with all of the propionaldehyde to form trimethylolethane. The stream of residue from the distillation, containing 55.5% water, is then further concentrated by heating it in an evaporator at a subatmospheric pressure of 425 mm. of Hg absolute until it attains a solids content of 70%. The resulting hot, thin syrup containing about 70% dissolved solids is mixed in a decanter with a continuous stream of aqueous isopropanol to give a mixture having a temperature of 43° C. and containing, by weight, 43% of isopropanol, 22% water, 14.5% sodium formate and the balance trimethylolethane and small amounts of impurities. This mixture separates into a lower aqueous phase, containing dissolved therein most of the sodium formate and also containing some crystalline sodium formate, and an upper isopropanol phase. The lower phase is discarded or may be recycled to the evaporator, while the upper phase is fed to a 30 tray distillation column where steam at atmospheric pressure is passed through said upper phase to remove the isopropanol therefrom in the form of the isopropanol-water azeotrope. This azeotrope is recycled to the decanter. The residue from the isopropanol stripping column is cooled to 20° C. to precipitate crystals of trimethylolethane, which crystals are isolated by centrifuging and then washed with one half their weight of ice water.

The resulting washed crude crystals, containing 2.4% of sodium formate and 26.1% of water, are then purified by subjecting them to a recrystallizing operation. Thus, they are mixed with an equal weight, on a dry crystal basis, of hot water, at a temperature of 60 to 100° C. to form a solution, the solution is then cooled to 20° C., and the resulting crystals are isolated by centrifuging and then washed with one half their weight of ice water.

The various wash liquors and mother liquors are suitably recycled. Thus, a portion of mother liquor from the crude crystallization operation is recycled to the evaporator. The wash water from the crude crystallization operation (together with a portion of the mother liquor from said operation and the mother liquor and wash water from the recrystallization operation) is recycled by mixing it with the residue from the isopropanol stripping column. In order to prevent impurities from building up in the process a portion of the mother liquor from the crude crystallization operation is discarded. The yield of purified crystals, containing 32.5% by weight of water, is about 86% based on the weight of the propionaldehyde charged to the system.

*Example II*

2560 parts by weight per hour of 20.0% aqueous solution of formaldehyde (17 moles), 100 parts by weight per hour of propionaldehyde of 99% purity (1.7 moles) and a solution of 75 parts by weight per hour of sodium hydroxide (1.87 moles) in 300 parts by weight per hour of water are blended continuously, at an initial temperature of 24° C., in a mixing zone to form a continuous stream of reaction mixture, which is passed continuously through a suitable reactor. Due to the heat of reaction the temperature of the stream flowing through the reactor rises within 20 minutes after mixing to 49° C. The stream of reaction mixture is permitted to react adiabatically while flowing through the reactor for a total period of one hour, during which time the temperature does not rise above 49° C., and is then acidified to a pH of 6.5 by the addition of acetic acid.

In the same manner as described in Example I, the resulting acidified stream is then subjected to continuous distillation under pressure to remove formaldehyde and heated in an evaporator to produce a hot, thin syrup containing about 70% of dissolved solids. This hot syrup is chilled to 15° C. to precipitate crystals therefrom. The mother liquor is removed from the crystals by filteration or centrifuging and the crystals are then washed with ¼ of their weight of ice water. The mother liquor is then treated for the removal of the trimethylolethane content thereof by mixing said mother liquor in a decanter with 223 parts by weight per hour of an azeotropic mixture of isopropanol and water. Two liquid phases form. The aqueous bottom phase is discarded, while the upper phase comprising isopropanol is steam-stripped, as in Example I, to distill off the isopropanol-water azeotrope, which is recycled to the decanter. The residue from the steam-stripping operation is concentrated by heating it in an evaporator at atmospheric pressure until it attains a temperature of 120° C., after which it is cooled to a temperature of 15° C. to cause the precipitation of crystals therefrom. These crystals are separated from their mother liquor by centrifuging, and then washed with ¼ their weight of ice water.

The mother liquor and wash liquors are recycled in a manner similar to Example I.

The yield of crystals of trimethylolethane obtained by this procedure is about 90% based on the weight of the propionaldehyde charged to the system.

*Example III*

4000 parts by weight per hour of 19.8% aqueous solution of formaldehyde (26.4 moles), 155 parts by weight per hour of propionaldehyde of 99% purity (2.64 moles) and a solution of 126 parts by weight per hour of sodium hydroxide (3.16 moles) in 480 parts by weight per hour of water are blended continuously, in a mixing zone, at a temperature of 24° C., which is the temperature of all of the blended materials, to form a continuous stream of reaction mixture which is passed through a suitable reactor. Due to the heat of the reaction the temperature of the stream flowing through the reactor rises within 5 minutes after mixing to 55° C. The stream of reaction mixture is permitted to react adiabatically while flowing through the reactor for a total period of one hour, during which time the temperature does not rise above 55° C., and is then acidified to a pH of 6.0 by the addition of formic acid. The resulting acidified stream is subjected to continuous distillation at a pressure of 15 pounds per square inch gauge and a temperature of 125° C. to reduce the formaldehyde content thereof to 0.1%. During this continuous distillation there is recovered, in the form of a 15 to 20% aqueous solution thereof, 98.5% of the excess formaldehyde, i. e. 98.5% of the amount of formaldehyde originally present in the reaction mixture in excess of that theoretically required to react with all of the propionaldehyde to form trimethylolethane. The stream of residue from the distillation is then concentrated by heating it in an evaporator at atmospheric pressure until it attains a temperature of 115° C. The resulting hot, thin syrup, containing about 70% dissolved solids, is cooled with agitation to a temperature of 10° C. to precipitate crystals therefrom. The mother liquor is removed from the crystals by filtration or centrifuging and the crystals are then washed with a small amount, i. e. less than half their weight, of water having a temperature of 0–5° C. 225 parts by weight per hour of washed crystals containing 19.7 parts by weight of water, 7.7 parts by weight of sodium formate and 197.6 parts of trimethylolethane are obtained. The mother liquor is further concentrated by heating it in a second evaporator at atmospheric pressure to a temperature of 120° C. and the resulting hot, thin syrup, containing about 70% of solids, is cooled to a temperature of 15° C. to produce 259 parts by weight per hour of a second crop of crystals, which crop is centrifuged and washed in the same manner as the first crop. This second crop of crystals, which comprises 63 parts by weight of trimethylolethane, 172 parts by weight of sodium formate and 24 parts by weight of water, is extracted with 200 parts of isopropanol having a temperature of 60 to 70° C., leaving a residue of 164 parts of crystalline sodium formate of 99% purity. The isopropanol extract is distilled continuously to evaporate off an azeotrope of water and isopropanol. To insure the recovery of all the isopropanol as distillate water is added continuously during the distillation operation. The residue from the distillation comprises a mixture of trimethylolethane and water, which water may be removed in any suitable manner, advantageously by recycling the mixture to the first evaporator, i. e. by mixing it with the residue obtained from the pressure distillation of the acidified reaction mixture. A portion of the mother liquor separated from the second crop of crystals may be recycled, e. g. to the first evaporator. However, the content of impurities, e. g. side reaction products, in this mother liquor is relatively high and, in order to prevent such impurities from building up in the process and contaminating the product, at least a portion of said mother liquor should be discarded. Alternatively, if desired, the mother liquor may be subjected to further steps of evaporation, cooling, crystallization, centrifuging and washing to produce a third crop of crystals comprising 31 parts by weight per hour of trimethylolethane, which crystals may be purified in the same manner as the second crop.

The crude trimethylolethane resulting from the process described above is further purified by dissolving it in hot isopropanol having a temperature of 60-70° C., the weight of isopropanol being equal to the weight of the trimethylolethane. The resulting solution is then cooled to a temperature of 15° C. to precipitate crystals of highly pure trimethylolethane melting at 200° C., containing less than 0.1% ash and having a hydroxyl value of 42.0.

*Example IV*

The procedure described in Example III is repeated except that methanol, instead of isopropanol, is used for leaching the second crop of crystals, and the crude trimethylolethane is purified, not by recrystallization from isopropanol, but rather by recrystallizing it from water, using a 1:1 weight ratio of water to crystals, an upper temperature of 80 to 100° C. and a lower temperature of 15° C. The recrystallized material is then dried under vacuum without heating to remove the bound water. The resulting product is of high purity and melts at 200.5° C.

*Example V*

150 gallons of dry n-propanol is thoroughly mixed with 12 gallons of water and 92 gallons of a concentrate comprising 25% by weight of water and the balance essentially trimethylolethane and sodium formate. The aforesaid concentrate is produced by the reaction of aqueous formaldehyde, propionaldehyde and sodium hydroxide, followed by neutralization, distillation of formaldehyde and evaporation of a portion of the water. The mixture of concentrate, water and n-propanol contains approximately 17% water, about 15% sodium formate, about 44% n-propanol and about 24% trimethylolethane. This mixture is allowed to stand at 36° C. whereupon it separates into an n-propanol layer, containing the major proportion of the trimethylolethane, and a much smaller water layer.

*Example VI*

77 gallons of the concentrate used in Example V, 38 gallons of the water layer produced in accordance with Example V, 6 gallons of water and 192 gallons of dry n-propanol are blended together to form a mixture comprising about 17% by weight of water, about 20% by weight of sodium formate, about 45% of n-propanol and about 18% by weight of trimethylolethane. On standing at 32° C. the mixture separates into an n-propanol layer, a water layer and a sludge layer comprising wet crystals of sodium formate.

It is to be understood that the foregoing detailed description is given merely by way of illustration and that many variations may be made therein without departing from the spirit of my invention.

Having described my invention, what I desire to secure by Letters Patent is:

1. Process for the production of trimethylolethane, which comprises continuously reacting, in an aqueous medium, a mixture of propionaldehyde, 5 to 15 moles of formaldehyde per mole of propionaldehyde and sodium hydroxide, to produce trimethylolethane and sodium formate, continuously reducing the pH of the reacted mixture, then continuously removing unreacted formaldehyde by distillation of the mixture under superatmospheric pressure, and thereafter isolating crystals comprising trimethylolethane from the mixture.

2. Process as set forth in claim 1 in which the proportions of sodium hydroxide are 1.0 to 1.3 moles of sodium hydroxide per mole of propionaldehyde.

3. Process as set forth in claim 2 in which there are about 8 to 12 moles of formaldehyde per mole of propionaldehyde.

4. Process as set forth in claim 1 in which the reaction is continued until about 3 moles of formaldehyde and about 1 mole of sodium hydroxide have been consumed for each mole of propionaldehyde originally present.

5. Process as set forth in claim 1 in which, during the reaction, the temperature of the mixture rises to about 40 to 55° C.

6. Process as set forth in claim 5 in which the temperature of the reaction mixture rises from an initial temperature of about 24° C. to a temperature of 49° C.

7. Process for the production of trimethylolethane, which comprises continuously reacting, in an aqueous medium containing at least about 70% of water, a mixture of priopionaldehyde, excess formaldehyde and sodium hydroxide, to produce trimethylolethane and sodium formate, continuously reducing the pH of the reacted mixture, then continuously removing unreacted formaldehyde by distillation of the mixture under superatmospheric pressure, and thereafter isolating crystals comprising trimethylolethane from the mixture by heating the reacted mixture and evaporating water therefrom until the water content of said mixture is 30 to 40%, followed by cooling to precipitate said crystals.

8. Process as set forth in claim 7 in which said crystals are separated from the mother liquor and the mother liquor is concentrated by evaporation to a water content of 30 to 40% followed by cooling to precipitate a second crop of crystals comprising trimethylolethane and sodium formate.

9. Process as set forth in claim 7 in which said crystals are separated from the mother liquor and said mother liquor, comprising an aqueous solution of trimethylolethane and sodium formate, is mixed with a lower aliphatic alcohol as solvent for said trimethylolethane, which solvent is a non-solvent for sodium formate, to form a multiphase mixture, comprising a liquid aqueous phase containing water and most of the dissolved sodium formate and a liquid organic solvent phase containing said solvent and most of the trimethylolethane, and separating said organic solvent phase from said aqueous phase.

10. Process as set forth in claim 1 in which said crystals are isolated by a process which comprises adding to an aqueous mixture comprising the products of said reaction a lower aliphatic alcohol as solvent for said trimethylolethane, which solvent is a non-solvent for sodium formate, to form a multiphase mixture comprising a liquid aqueous phase containing water and most of the dissolved sodium formate and a liquid organic solvent phase containing said solvent and most of the trimethylolethane, and separating said organic solvent phase from said aqueous phase.

11. Process for the continuous production of trimethylolethane, which comprises continuously forming a mixture, in an aqueous medium, of one mole of propionaldehyde, 5 to 15 moles of formaldehyde, and 1.0 to 1.3 moles of sodium hydroxide, maintaining said mixture, in the form of a continuous stream, at a temperature of about 40 to 55° C. to produce a stream of reacted mixture comprising trimethylolethane and sodium formate, and recovering trimethylolethane and unreacted formaldehyde from said reacted mixture.

12. Process as set forth in claim 11 in which the stream of reacted mixture is continuously acidified to a pH of 5.5 to 7.0 and the acidified mixture is continuously distilled under superatmospheric pressure to remove aqueous formaldehyde therefrom until the formaldehyde content of the distillation residue is not above about 1.0%.

13. Process for the continuous production of trimethylolethane, which comprises continuously forming a mixture of one mole of propionaldehyde, about 8 to 12 moles of formaldehyde, about 1.1 to 1.2 moles of sodium hydroxide and about 78 to 80% of water rapidly and with agitation, maintaining said mixture in the form of a continuous stream, at a temperature of about 40 to 55° C. until about 3 moles of formaldehyde and about 1 mole of sodium hydroxide have been consumed for each mole of propionaldehyde originally present, continuously reducing the pH of the reacted mixture to about 6.0 to 7.0, continuously removing formaldehyde by distillation of the acidified mixture under pressure of about 10 to 30 p. s. i. g. until the formaldehyde content of the distillation residue is not above about $\frac{1}{30}$ of the trimethylolethane content of said residue, thereafter concentrating said residue by heating said residue to evaporate water therefrom until the water content of said residue is about 20 to 60%, and isolating crystals comprising trimethylolethane from said residue.

14. Process for the isolation of trimethylolethane from a water solution of trimethylolethane and sodium formate, which comprises adding to said solution a lower aliphatic alcohol as solvent for said trimethylolethane, which solvent is a non-solvent for sodium formate, to form a multiphase mixture comprising a liquid aqueous phase containing water and most of the dissolved sodium formate and a liquid organic solvent phase containing said solvent and most of the trimethylolethane, and separating said organic solvent phase from said aqueous phase.

15. Process as set forth in claim 14 in which said solvent is n-propanol.

16. Process as set forth in claim 14 in which said solvent is isopropanol.

17. Process as set forth in claim 14 which comprises heating said organic solvent phase in the presence of added water to remove the solvent therefrom and to produce a water solution of trimethylolethane, and cooling said solution to precipitate crystals of trimethylolethane therefrom.

18. Process as set forth in claim 17, said solvent being one which forms an azeotrope with water, said azeotrope being distilled off by said heating, and said azeotrope being recycled to combine with a further quantity of said water solution of trimethylolethane and sodium formate.

19. Process as set forth in claim 14 in which said water solution of trimethylolethane and sodium formate is obtained by the reaction of an aqueous mixture of sodium hydroxide, propionaldehyde and formaldehyde.

20. Process as set forth in claim 14 in which said multiphase mixture comprises undissolved crystals of sodium formate, said crystals being covered by said liquid aqueous phase.

21. Process as set forth in claim 14, which comprises adding water to said separated organic solvent containing said trimethylolethane, transferring said trimethylolethane from said solvent to said water to form an aqueous solution of said trimethylolethane and recovering trimethylolethane from said aqueous solution.

References Cited in the file of this patent
UNITED STATES PATENTS

| Number | Name | Date |
|---|---|---|
| Re. 23,584 | Jackson et al. | Nov. 18, 1952 |
| 2,004,010 | Naujoks | June 4, 1935 |
| 2,292,926 | Brubaker et al. | Aug. 11, 1942 |
| 2,369,083 | Spurlin | Feb. 6, 1945 |
| 2,407,920 | Cox | Sept. 17, 1946 |
| 2,420,496 | Poitras et al. | May 13, 1947 |
| 2,468,718 | Wyler | Apr. 26, 1949 |
| 2,562,102 | Jackson et al. | July 24, 1951 |
| 2,671,118 | Gangwer | Mar. 2, 1954 |
| 2,696,507 | Cake | Dec. 7, 1954 |